(12) United States Patent
Zisapel et al.

(10) Patent No.: US 7,984,148 B2
(45) Date of Patent: Jul. 19, 2011

(54) LOAD BALANCING

(75) Inventors: Roy Zisapel, Tel Aviv (IL); Amir Peless, Tel Aviv (IL)

(73) Assignee: Radware Ltd., Tel Aviv (IL)

( * ) Notice: Subject to any disclaimer, the term of this patent is extended or adjusted under 35 U.S.C. 154(b) by 1977 days.

(21) Appl. No.: 10/703,540

(22) Filed: Nov. 10, 2003

(65) Prior Publication Data

US 2005/0022203 A1 Jan. 27, 2005

Related U.S. Application Data

(63) Continuation of application No. 09/776,780, filed on Feb. 6, 2001, now Pat. No. 6,718,359, which is a continuation of application No. 09/115,643, filed on Jul. 15, 1998, now Pat. No. 6,249,801.

(51) Int. Cl.
*G06F 11/30* (2006.01)
(52) U.S. Cl. ........ 709/226; 709/224; 709/238; 718/105; 718/102
(58) Field of Classification Search .................. 718/105, 718/104, 102; 709/226, 238, 224
See application file for complete search history.

(56) References Cited

U.S. PATENT DOCUMENTS

| | | |
|---|---|---|
| 4,495,570 A | 1/1985 | Kitajima et al. |
| 4,884,263 A | 11/1989 | Suzuki |
| 4,953,162 A | 8/1990 | Lyons et al. |
| 5,349,682 A | 9/1994 | Rosenberry |
| 5,491,786 A | 2/1996 | Egan et al. |
| 5,511,168 A | 4/1996 | Perlman et al. |
| 5,774,660 A | 6/1998 | Brendel et al. |
| 5,805,586 A | 9/1998 | Perreault et al. |
| 5,867,495 A | 2/1999 | Elliott et al. |
| 5,884,038 A | 3/1999 | Kapoor |
| 5,915,095 A | 6/1999 | Miskowiec |
| 5,951,634 A | 9/1999 | Sitbon et al. |
| 6,003,030 A | 12/1999 | Kenner et al. |
| 6,006,264 A | 12/1999 | Colby et al. |
| 6,038,599 A | 3/2000 | Black et al. |
| 6,047,329 A | 4/2000 | Horikawa et al. |
| 6,067,545 A | 5/2000 | Wolff |
| 6,070,191 A | 5/2000 | Narendran et al. ........... 709/226 |

(Continued)

OTHER PUBLICATIONS

Goldszmidt et al., "Load Distribution for Scalable Web Server: Summer Olympics 1996—A Case Study," Proceedings of the 8th IFIP/IEEE International Workshop on Distributed Systems: Operations and Management, Sydney, Australia (Oct. 1997).

(Continued)

*Primary Examiner* — Kenneth R Coulter
(74) *Attorney, Agent, or Firm* — Katten Muchin Rosenman LLP

(57) ABSTRACT

A method for load balancing requests on a network, the method including receiving a request from a requester having a requester network address at a first load balancer having a first load balancer network address, the request having a source address indicating the requestor network address and a destination address indicating the first load balancer network address, forwarding the request from the first load balancer to a second load balancer at a triangulation network address, the request source address indicating the requester network address and the destination address indicating the triangulation network address, the triangulation network address being associated with the first load balancer network address, and sending a response from the second load balancer to the requestor at the requestor network address, the response having a source address indicating the first load balancer network address associated with the triangulation network address and a destination address indicating the first requestor network address.

13 Claims, 9 Drawing Sheets

U.S. PATENT DOCUMENTS

| | | | | |
|---|---|---|---|---|
| 6,078,943 | A | 6/2000 | Yu | 709/105 |
| 6,078,953 | A | 6/2000 | Vaid et al. | 709/223 |
| 6,092,178 | A | 7/2000 | Jindal et al. | 712/27 |
| 6,098,091 | A | 8/2000 | Kisor | 709/202 |
| 6,112,239 | A | 8/2000 | Kenner et al. | 709/224 |
| 6,115,752 | A | 9/2000 | Chauhan | |
| 6,119,170 | A | 9/2000 | Schoffelman et al. | |
| 6,122,743 | A | 9/2000 | Shaffer et al. | |
| 6,138,159 | A | 10/2000 | Phaal | |
| 6,167,438 | A | 12/2000 | Yates et al. | 709/216 |
| 6,182,139 | B1 | 1/2001 | Brendel | |
| 6,185,619 | B1 | 2/2001 | Joffe et al. | |
| 6,205,146 | B1 * | 3/2001 | Rochberger et al. | 370/395.53 |
| 6,216,163 | B1 | 4/2001 | Bharali et al. | |
| 6,249,800 | B1 | 6/2001 | Aman et al. | |
| 6,249,801 | B1 * | 6/2001 | Zisapel et al. | 718/105 |
| 6,269,391 | B1 | 7/2001 | Gilespie | 709/100 |
| 6,297,823 | B1 | 10/2001 | Bharali et al. | |
| 6,314,093 | B1 | 11/2001 | Mann et al. | |
| 6,324,580 | B1 * | 11/2001 | Jindal et al. | 709/228 |
| 6,327,622 | B1 * | 12/2001 | Jindal et al. | 709/228 |
| 6,347,078 | B1 | 2/2002 | Narvaez-Guarnieri et al. | 370/230 |
| 6,397,260 | B1 | 5/2002 | Wils et al. | 709/238 |
| 6,446,121 | B1 | 9/2002 | Shah et al. | |
| 6,457,054 | B1 | 9/2002 | Bakshi | |
| 6,487,177 | B1 | 11/2002 | Weston-Dawkes | 370/254 |
| 6,493,318 | B1 | 12/2002 | Bare | 370/238 |
| 6,502,125 | B1 | 12/2002 | Kenner et al. | 709/203 |
| 6,549,516 | B1 | 4/2003 | Albert et al. | 370/236 |
| 6,601,084 | B1 | 7/2003 | Bhaskaran et al. | |
| 6,665,702 | B1 * | 12/2003 | Zisapel et al. | 718/105 |
| 6,687,731 | B1 | 2/2004 | Kavak | |
| 6,718,359 | B2 * | 4/2004 | Peless et al. | 718/105 |
| 6,735,631 | B1 | 5/2004 | Oehrke et al. | |
| 6,754,181 | B1 | 6/2004 | Elliott et al. | |
| 2003/0195984 | A1 * | 10/2003 | Zisapel et al. | 709/238 |

OTHER PUBLICATIONS

Bhattacharjee, et al., "Application-Layer Anycasting," Proceedings of INFOCOMM'97, Kobe, Japan, Apr. 1997.

M. Korkea-aho, "Scalability in Distributed Multimedia Systems," Master's Thesis, Helsinki University of Technology (Nov. 5, 1995) (also available at http://www.hut.fi/~mkorkeaa/thesis.html).

Seshan et al., "SPAND: Shared Passive Network Performance Discovery," Proceedings of USENIX Symposium on Internet Technologies and Systems, 1997.

Crovella and Carter, "Dynamic Server Selection in the Internet," Proceedings of the Third IEEE Workshop on the Architecture and Implementation of High Performance Communication Subsystems, (Jun. 30, 1995).

Carter and Crovella, "Dynamic Server Selection Using Bandwidth Probing in Wide-Area Networks," BU-CS-96-007, Boston University (Mar. 18, 1996).

Carter and Crovella, "Measuring Bottleneck Link Speed in Packet-Switched Networks," BU-CS-96-006, Boston University (Mar. 15, 1996).

Guyton, et al., "Locating Nearby Replicated Internet Servers," University of Colorado at Boulder Technical Report CU-CS-762-95, (Feb. 1995).

Fyodor, "The Art of Port Scanning," available at http://www.insecure.org/nmap/nmap_doc.html (Sep. 6, 1997).

RFC 1470, Internet Engineering Task Force (IETF), available at http://www.ietf.org/rfc/trfc1470.txt?number=1470 (Jun. 1993).

Mathis and Mahdavi, "Diagnosing Internet congestion with a transport layer performance tool," Proc. INET'96 (1996).

Cisco DistributedDirector, whitepaper (1996).

Radcliff, "Traffic Jam—includes related articles on long-distance telco revenues, spamming, an emerging high-quality Internet2 and Internet use by the The National Center for Missing and Exploited Children—Electronic Commerce—Internet/Web/Online Service Information," Software Magazine (Nov. 1997).

Claffy, Polyzos, and Braun, "Measurement Considerations for Assessing Unidirectional Latencies," Internetworking: Research and Experience, vol. 4, No. 3, pp. 121-132, (Sep. 1993).

Resonate Global Dispatch FAQ (1997).

"Ping(8)," Berkeley Distribution (Mar. 1, 1997).

"Ping.c," (Mar. 1988).

Dr. Watson (DWTNDA) "The Network Detective's AssistantTM v.1.2," EMPIRICAL Tools & Technologies (Nov. 15, 1997).

Mosemann, "Net::Ping" (1996).

"Traceping," (May 14, 1997).

"Traceroute(8)", Berkeley Distribution (Apr. 1997).

"Tracert", Microsoft Corp. (1995).

Maimon, "TCP Port Stealth Scanning," Phrack 7, 49 (Nov. 8, 1996).

Comer, "Internetworking with TCP/IP vol. 1: Principles, Protocols, and Architecture Second Edition," Prentice Hall, Englewood Cliffs, NJ (1991), Chapters 9, 11, 13, 14, 15, and 18.

Guerin, Orda, and Williams, "QOS Routing Mechanisms and OSPF Extensions," IETF Internet Draft (Nov. 5, 1996).

U.S. Appl. No. 60/032,484, filed Dec. 9, 1996.
U.S. Appl. No. 60/042,235, filed Apr. 15, 1997.
U.S. Appl. No. 60/043,502, filed Apr. 14, 1997.
U.S. Appl. No. 60/043,503, filed Apr. 14, 1997.
U.S. Appl. No. 60/043,515, filed Apr. 14, 1997.
U.S. Appl. No. 60/043,524, filed Apr. 15, 1997.
U.S. Appl. No. 60/043,586, filed Apr. 14, 1997.
U.S. Appl. No. 60/043,621, filed Apr. 14, 1997.
U.S. Appl. No. 60/043,691, filed Apr. 15, 1997.
U.S. Appl. No. 60/054,687, filed Aug. 1, 1997.
U.S. Appl. No. 60/084,278, filed May 4, 1998.

Praveen Akkiraju et al., "Enabling Enterprise Multihoming with Cisco IOS Network Address Translation (NAT)," Cisco Systems Inc. Online! 1997.

Mark E. Crovella & Rovert L. Carter, "Dynamic Server Selection in the Internet," In Proc. of the Third IEEE Workshop on the Architecture and Implementation of High Performance Communication Subsystems (HPCS '95), Jun. 30, 1995.

Peter Sanders, "A Detailed Analysis of Random Polling Dynamic Load Balancing," 1994 International Symposium on Parallel Architectures, Algorithms and Networks, pp. 382-389.

Azer Bestavros, "Speculative Data Dissemination and Service to Reduce Server Load, Network Traffic and Service Time in Distributed Information System," IEEE 1996, pp. 180-187.

Gil-Haeng Lee, "Using System State Information for Adaptive State Polling Policy in Distributed Load Balancing," 1997 IEEE, pp. 166-173.

Bruce Hajek, "Performance of Global Load Balancing by Local Adjustment," Transactions on Information Theory, vol. 36, 6:1398-1414 (Nov. 1990).

Phillip Krueger and Niranjan G. Shivaratri, "Adaptive Location Policies for Global Scheduling," IEEE Transactions on Software Engineering, vol. 20, 6:432-444 (Jun. 1994).

Gil-Haeng Lee et al., "A Sender-Initiated Adaptive Load Balancing Scheme Based on Predictable State Knowledge," IEICE Transactions on Information and Systems, E79-D:3 (Mar. 1996) pp. 209-221.

P. Sanders, "A Detailed Analysis of Random Polling Dynamic Load Balancing," Proceedings of the 1994 International Symposium on Parallel Architectures, Algorithms and Networks (ISPAN) (Cat. No. 94TH0697-3) 382-9, 1994.

E. Haddad, "Optimal Load Sharing in Dynamically Heterogeneous Systems," Proceedings Seventh IEEE Symposium on Parallel and Distributed Processing (Cat. No. 95TB8183):346-53, 1995.

B. Bing and R. Subramanian, Abstract of "An Efficient Multiaccess Technique with Stability Control for Multimedia Personal Communication Networks," Journal of the Institute of Engineers Singapore, vol. 38, 1:17-25 (1998).

R.S. Engelschall, "Balancing Your Website, Practical Approaches for Distributing HTTP Traffic," WEB Techniques vol. 3 5:45-6, 48-50, 52 (1998).

Chin Lu and Sau Ming Lau, Abstract of "A Performance Study on Different Classes of Load Balancing Algorithms," Proceedings of the Fourteenth International Conference Applied Informatics: 39-42, 1996.

Gil-Haeng Lee et al., "A Prediction-Based Adaptive Location Policy for Distributed Load Balancing," Journal of Systems Architecture, vol. 42, 1:1-18 (Aug. 1996).

K. Benmohammed-Mahieddine et al., Abstract of "A Periodic Symmetrically-Initiated Load Balancing Algorithm for Distributed Systems," Proceedings of the 14th International Conference on Distributed Computing Systems (Cat. No. 94CH3450-4):616-23, 1994.

G. Goldszmidt, G. Hunt, "NetDispatcher: A TCP Connection Router," IBM Research Report, pp. 1-20, RC20853 (May 19, 1997).

Genuity's Industrial Strength Solution to Net Traffic, placed in file on Apr. 15, 2005.

Hopsctoch™ combines Web/data servers that are strategically located at all the major NAPs with a system that is able to: placed in file on Apr. 15, 2005.

Hopsctoch™ Optimized Web Access—prepared by: Rodney Joffe, Henry Heflich, Mar. 11, 1997.

Hopsctoch™—Genuity's Industrial Strength Solution to Net Traffic http://web.archieve.org/web/199770529003846/http://hopscotch-sjc2.genuity.net/, (1997).

Bates, et al., "Scalable Support for Multi-Homed Multi-Provider Connectivity" Cisco Systems, Jan. 1998, pp. 1-12, RFC 2260.

Berkowitz, "To Be Mutlihomed: Requirements & Definitions Draft Berkowitz-Multirqmt-OI.txt" Mar. 1998, pp. 1-16, Internet Draft.

Pritchard, "Load Balanced Deadlock-Free Deterministic Routing of Arbitrary Networks" ACM 1992, pp. 225-234.

Crochat, et al., "A Path Selection Method in ATM Using Precomputation" Proceedings of IZS, Feb. 1996, pp. 1-12.

Aly E. El-Abd et al. "A Neural Network Approach for Dynamic Load Balancing in Homogeneous Distributed Systems," IEEE 1997, pp. 628-629.

Brochure: "CSD A Complete Solution for Enhancing Cache Server Farm Performance," RadWare Ltd., 1997.

Brochure: "WSD-DS," RadWare Ltd., 1997.

Brochure: "WSD-NP A Powerful Global Load Balancing Solution," RadWare Ltd., 1997.

Brochure: "WSD, WSD—Pro," RadWare Ltd., 1997.

B. Gengler, "RND Server Eases Web Site Congestion," Internetwork, 7(11) 1996.

R. J. Kohlhepp, "Web Server Director Keeps Intersections Clear," Network Computing, 1997.

A. Rogers, "Easing Web Jam With Distributed Servers," Communications Week, No. 632, 1996.

J. Taschek, "A Well-Balanced Web," Internet Computing, 1998.

P. Boyle, "Web Site Traffic Cops," PC Magazine, Feb. 18, 1997.

Corvella et al.; Dynamic Server Selection in the Internet; Computer Science Department, Boston University; pp. 1-5; Jun. 1995.

* cited by examiner

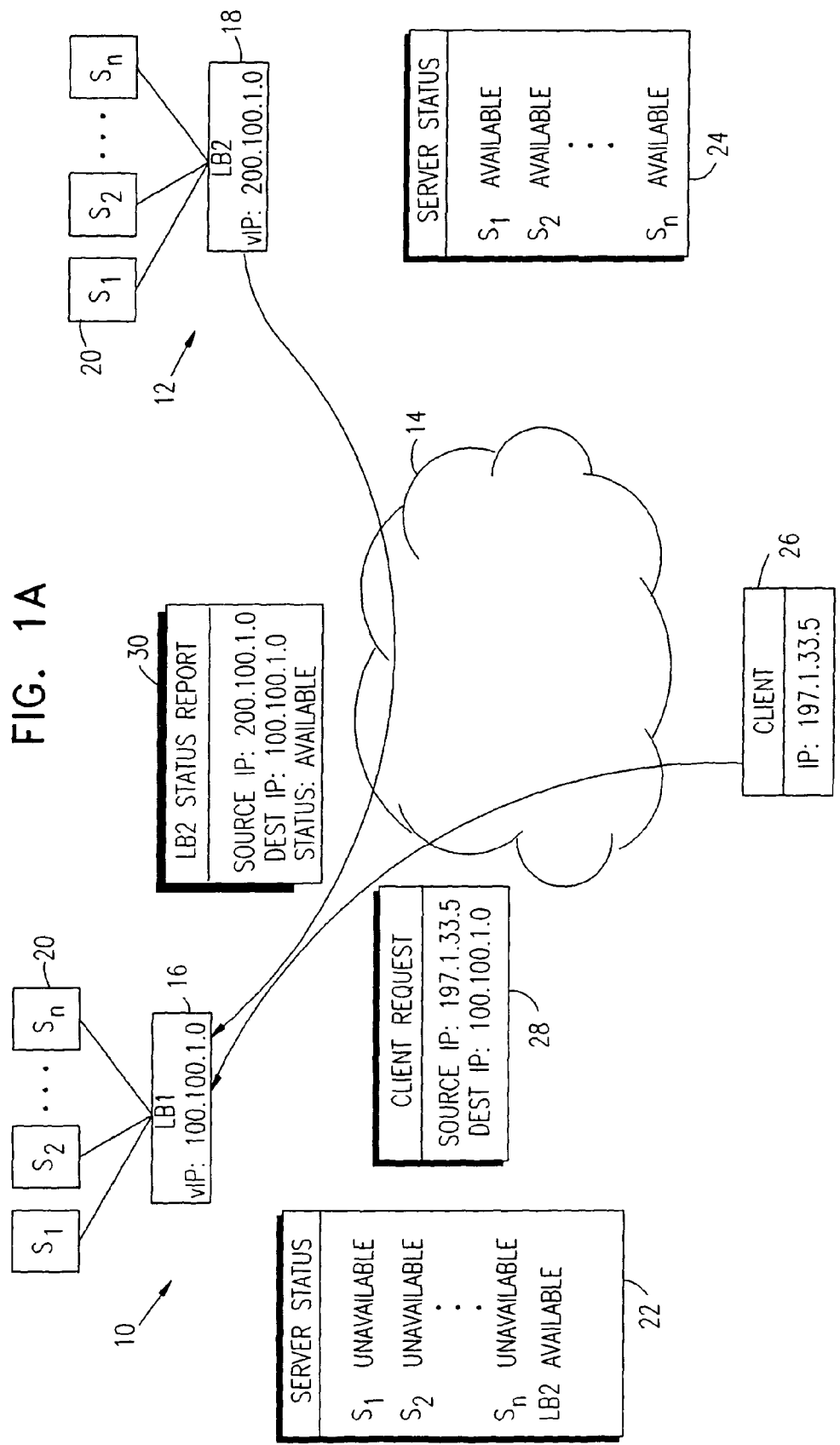

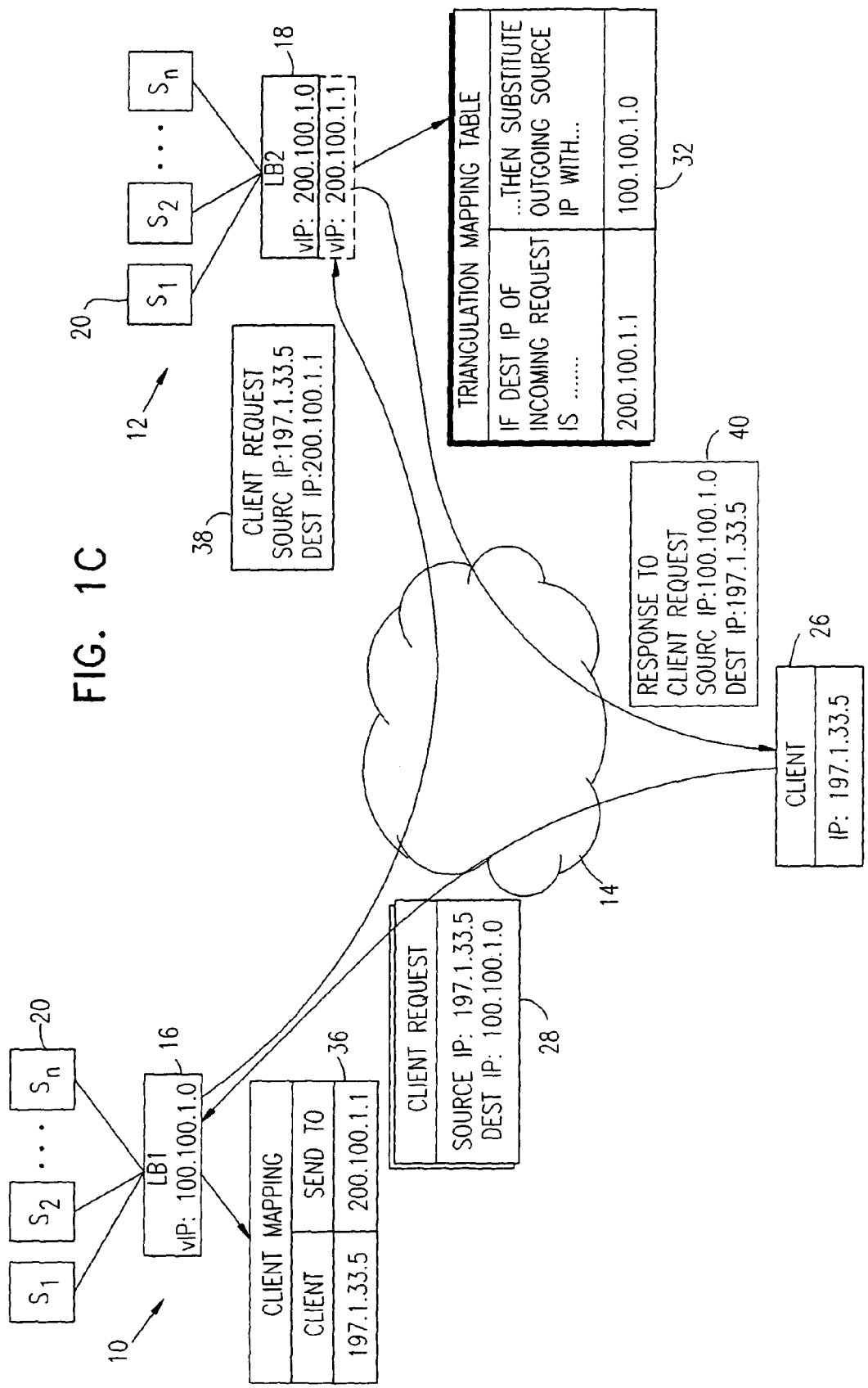

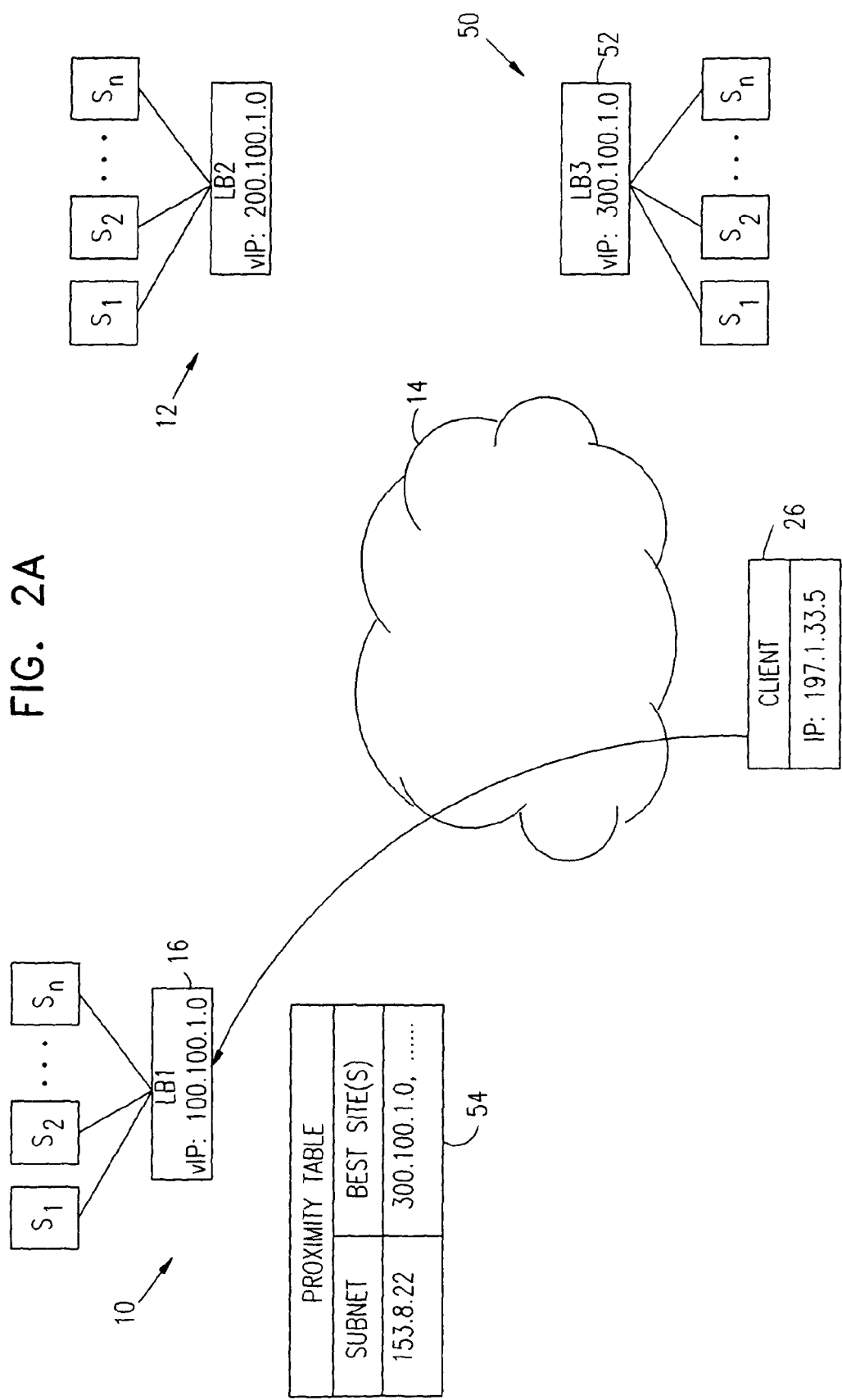

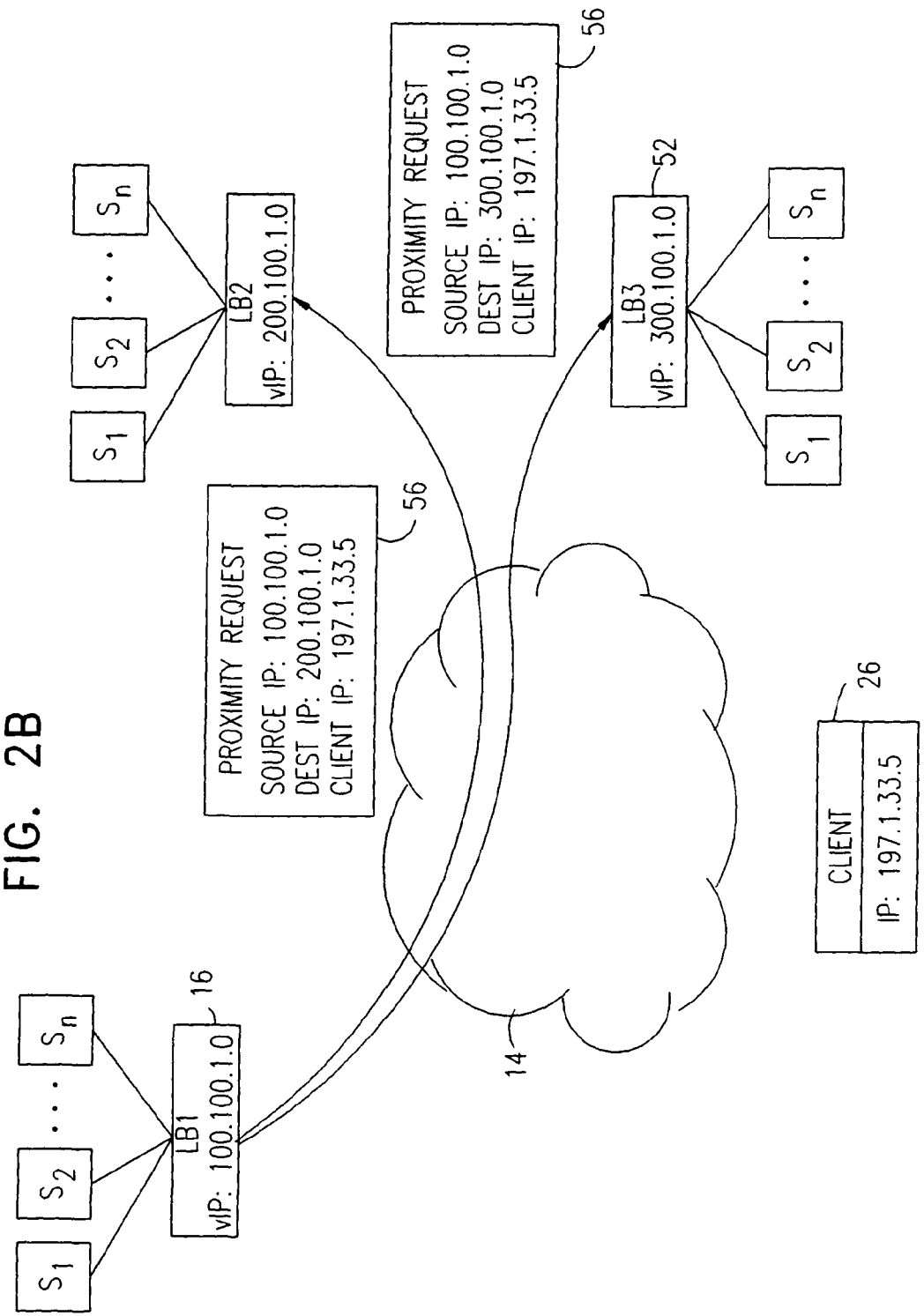

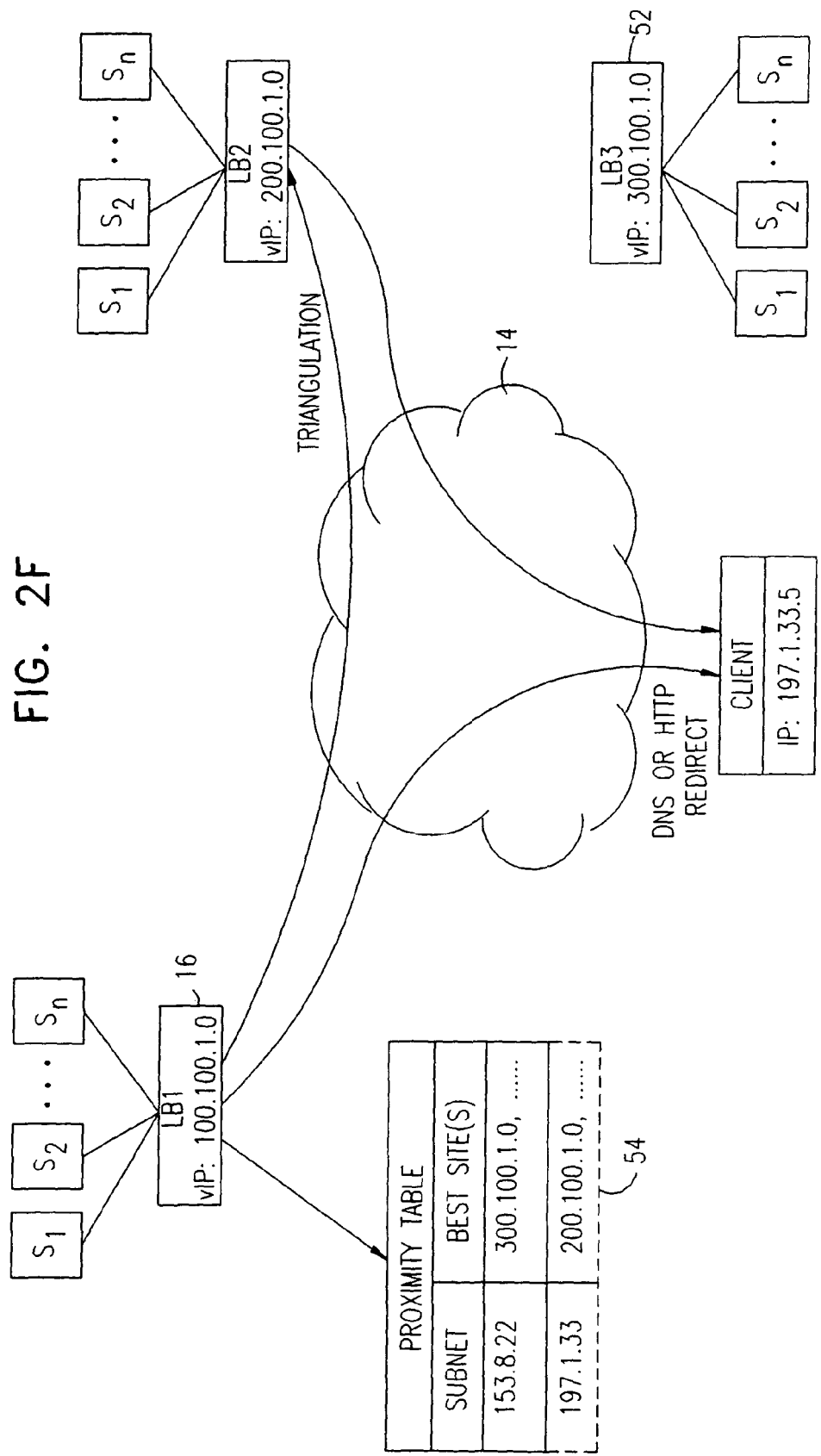

LOAD BALANCING

This is a continuation of application Ser. No. 09/776,780, filed Feb. 6, 2001 now U.S. Pat. No. 6,718,359, which is a continuation of application Ser. No. 09/115,643, filed Jul. 15, 1998, now U.S. Pat. No. 6,249,801 all of which are incorporated herein by reference.

FIELD OF THE INVENTION

The present invention relates to computer networks in general, and in particular to load balancing client requests among redundant network servers in different geographical locations.

BACKGROUND OF THE INVENTION

In computer networks, such as the Internet, preventing a server from becoming overloaded with requests from clients may be accomplished by providing several servers having redundant capabilities and managing the distribution of client requests among the servers through a process known as "load balancing."

In one early implementation of load balancing, a Domain Naming System (DNS) server connected to the Internet is configured to maintain several IP addresses for a single domain name, with each address corresponding to one of several servers having redundant capabilities. The DNS server receives a request for address translation and responds by returning the list of server addresses from which the client chooses one address at random to connect to. Alternatively, the DNS server returns a single address chosen either at random or in a round-robin fashion, or actively monitors each of the servers and returns a single address based on server load and availability.

More recently, a device known as a "load balancer," such as the Web Server Director, commercially available from the Applicant/assignee, has been used to balance server loads as follows. The load balancer is provided as a gateway to several redundant servers typically situated in a single geographical location and referred to as a "server farm" or "server cluster." DNS servers store the IP address of the load balancer rather than the addresses of the servers to which the load balancer is connected. The load balancer's address is referred to as a "virtual IP address" in that it masks the addresses of the servers to which it is connected. Client requests are addressed to the virtual IP address of the load balancer which then sends the request to a server based on server load and availability or using other known techniques.

Just as redundant servers in combination with a load balancer may be used to prevent server overload, redundant server farms may be used to reroute client requests received at a first load balancer/server farm to a second load balancer/server farm where none of the servers in the first server farm are available to tend to the request. One rerouting method currently being used involves sending an HTTP redirect message from the first load balancer/server farm to the client instructing the client to reroute the request to the second load balancer/server farm indicated in the redirect message. This method of load balancing is disadvantageous in that it can only be employed in response to HTTP requests, and not for other types of requests such as FTP requests. Another rerouting method involves configuring the first load balancer to act as a DNS server. Upon receiving a DNS request, the first load balancer simply returns the virtual IP address of the second load balancer. This method of load balancing is disadvantageous in that it can only be employed in response to DNS requests where there is no guarantee that the request will come to the first load balancer since the request does not come directly from the client, and where subsequent requests to intermediate DNS servers may result in a previously cached response being returned with a virtual IP address of a load balancer that is no longer available.

Where redundant server farms are situated in more than one geographical location, the geographical location of a client may be considered when determining the load balancer to which the client's requests should be routed, in addition to employing conventional load balancing techniques. However, routing client requests to the geographically nearest server, load balancer, or server farm might not necessarily provide the client with the best service if, for example, routing the request to a geographically more distant location would otherwise result in reduced latency, fewer hops, or provide more processing capacity at the server.

SUMMARY OF THE INVENTION

The present invention seeks to provide novel apparatus and methods for load balancing client requests among redundant network servers and server farms in different geographical locations which overcome the known disadvantages of the prior art as discussed above.

There is thus provided in accordance with a preferred embodiment of the present invention a method for load balancing requests on a network, the method including receiving a request from a requester having a requestor network address at a first load balancer having a first load balancer network address, the request having a source address indicating the requester network address and a destination address indicating the first load balancer network address, forwarding the request from the first load balancer to a second load balancer at a triangulation network address, the request source address indicating the requestor network address and the destination address indicating the triangulation network address, the triangulation network address being associated with the first load balancer network address, and sending a response from the second load balancer to the requestor at the requestor network address, the response having a source address indicating the first load balancer network address associated with the triangulation network address and a destination address indicating the first requestor network address.

Further in accordance with a preferred embodiment of the present invention the method includes maintaining the association between the triangulation network address and the first load balancer network address at either of the load balancers.

Still further in accordance with a preferred embodiment of the present invention the method includes maintaining the association between the triangulation network address and the first load balancer network address at the second load balancer, and communicating the association to the first load balancer.

Additionally in accordance with a preferred embodiment of the present invention the method includes directing the request from the second load balancer to a server in communication with the second load balancer, composing the response at the server, and providing the response to the second load balancer.

There is also provided in accordance with a preferred embodiment of the present invention a method for load balancing requests on a network, the method including determining the network proximity of a requestor with respect to each of at least two load balancers, designating a closest one of the load balancers by ranking the load balancers by network proximity, and directing requests from the requestor to the closest load balancer.

Further in accordance with a preferred embodiment of the present invention the method includes directing requests from any source having a subnet that is the same as the subnet of the requestor to the closest load balancer.

Still further in accordance with a preferred embodiment of the present invention the method includes monitoring the current load of each of the load balancers, and performing the directing step the current load of the closest load balancer is less than the current load of every other of the load balancers.

Additionally in accordance with a preferred embodiment of the present invention the determining step includes periodically determining.

Moreover in accordance with a preferred embodiment of the present invention the determining step includes determining at at least one fixed time.

Further in accordance with a preferred embodiment of the present invention the determining step includes polling the requestor to yield at least two attributes selected from the group consisting of: latency, relative TTL, and number of hops to requestor.

Still further in accordance with a preferred embodiment of the present invention the determining step includes polling the requestor using at least two polling methods selected from the group consisting of: pinging, sending a TCP ACK message to the requestor's source address and port, sending a TCP ACK message to the requestor's source address and port 80, and sending a UDP request to a sufficiently high port number as to elicit an "ICMP port unreachable" reply.

Additionally in accordance with a preferred embodiment of the present invention the designating step includes designating a closest one of the load balancers by ranking the load balancers by network proximity and either of current load and available capacity.

There is also provided in accordance with a preferred embodiment of the present invention a method for determining network proximity, the method including sending from each of at least two servers a UDP request having a starting TTL value to a client at a sufficiently high port number as to elicit an "ICMP port unreachable" reply message to at least one determining one of the servers indicating the UDP request's TTL value on arrival at the client, determining a number of hops from each of the servers to the client by subtracting the starting TTL value from the TTL value on arrival for each of the servers, and determining which of the servers has fewer hops of the client, and designating the server having fewer hops as being closer to the client than the other of the servers.

There is additionally provided in accordance with a preferred embodiment of the present invention a network load balancing system including a network, a first load balancer connected to the network and having a first load balancer network address, a second load balancer connected to the network and having a triangulation network address, the triangulation network address being associated with the first load balancer network address, and a requestor connected to the network and having a requestor network address, where the requestor is operative to send a request via the network to the first load balancer, the request having a source address indicating the requestor network address and a destination address indicating the first load balancer network address, the first load balancer is operative to forward the request to the second load balancer at the triangulation network address, the request source address indicating the requestor network address and the destination address indicating the triangulation network address, and the second load balancer is operative to send a response to the requestor at the requestor network address, the response having a source address indicating the first load balancer network address associated with the triangulation network address and a destination address indicating the first requestor network address.

Further in accordance with a preferred embodiment of the present invention either of the load balancers is operative to maintain a table of the association between the triangulation network address and the first load balancer network address.

Still further in accordance with a preferred embodiment of the present invention the second load balancer is operative to maintain a table of the association between the triangulation network address and the first load balancer network address and communicate the association to the first load balancer.

Additionally in accordance with a preferred embodiment of the present invention the system further includes a server in communication with the second load balancer, where the second load balancer is operative to direct the request from the second load balancer to the server, and the server is operative to compose the response and provide the response to the second load balancer.

There is also provided in accordance with a preferred embodiment of the present invention a network load balancing system including a network, at least two load balancers connected to the network, and a requestor connected to the network, where each of the at least two load balancers is operative to determine the network proximity of the requester, and at least one of the load balancers is operative to designate a closest one of the load balancers by ranking the load balancers by network proximity and direct requests from either of the requestor and a subnet of the requestor to the closest load balancer.

Further in accordance with a preferred embodiment of the present invention the load balancers are operative to poll the requestor to yield at least two attributes selected from the group consisting of: latency, relative TTL, and number of hops to requestor.

Still further in accordance with a preferred embodiment of the present invention the load balancers are operative to poll the requestor using at least two polling methods selected from the group consisting of pinging, sending a TCP ACK message to the requestor's source address and port, sending a TCP ACK message to the requestor's source address and port 80, and sending a UDP request to a sufficiently high port number as to elicit an "ICMP port unreachable" reply.

Additionally in accordance with a preferred embodiment of the present invention at least one of the load balancers is operative to designate the closest one of the load balancers by ranking the load balancers by network proximity and either of current load and available capacity.

It is noted that throughout the specification and claims the term "network proximity" refers to the quality of the relationship between a client and a first server or server farm as compared with the relationship between the client and a second server or server farm when collectively considering multiple measurable factors such as latency, hops, and server processing capacity.

BRIEF DESCRIPTION OF THE DRAWINGS

The present invention will be understood and appreciated from the following detailed description, taken in conjunction with the drawings in which:

FIGS. 1A-1C, taken together, are simplified pictorial flow illustrations of a triangulation load balancing system constructed and operative in accordance with a preferred embodiment of the present invention; and FIGS. 2A-2F, taken together, are simplified pictorial flow illustrations of a network proximity load balancing system constructed and operative in accordance with another preferred embodiment of the present invention.

DETAILED DESCRIPTION OF PREFERRED EMBODIMENTS

Figure 1B:
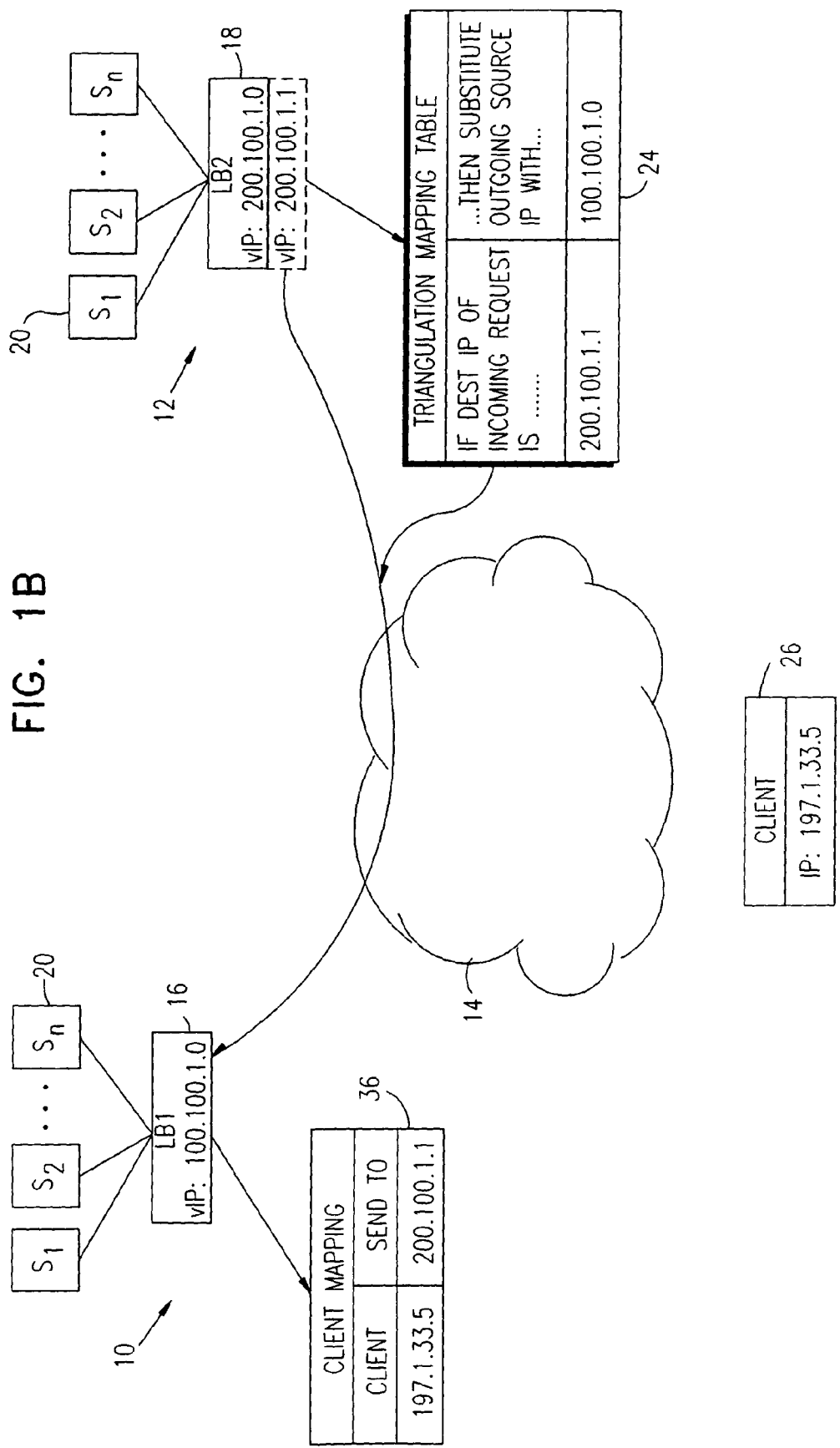

Reference is now made to FIGS. 1A-1C which, taken together, are simplified pictorial flow illustrations of a triangulation load balancing system constructed and operative in accordance with a preferred embodiment of the present invention. Two server farms, generally designated 10 and 12 respectively, are shown connected to a network 14, such as the Internet, although it is appreciated that more than two server farms may be provided. Server farms 10 and 12 typically comprise a load balancer 16 and 18 respectively, which may be a dedicated load balancer or a server or router configured to operate as a load balancer, with each of the load balancers being connected to one or more servers 20. Load balancers 16 and 18 are alternatively referred to herein as LB1 and LB2 respectively. LB1 and LB2 typically maintain a server status table 22 and 24 respectively, indicating the current load, configuration, availability, and other server information as is common to load balancers. LB1 and LB2 also typically periodically receive and maintain each other's overall status and load statistics such that LB1 and LB2 can know each other's availability.

Typical operation of the triangulation load balancing system of FIGS. 1A-1C is now described by way of example. As is shown more particularly with reference to FIG. 1A, a client 26, such as any known computer terminal configured for communication via network 14, is shown sending a request 28, such as an FTP or HTTP request, to LB1 whose virtual IP address is 100.100.1.0. In accordance with network transmission protocols, request 28 indicates the source IP address of the requestor, being the IP address 197.1.33.5 of client 26, and the destination IP address, being the virtual IP address 100.100.1.0 of LB1. LB2 preferably periodically sends a status report 30 to LB1, the virtual IP address 100.100.1.0 of LB1 being known in advance to LB2. Status report 30 typically indicates the availability of server farm 12 and provides load statistics, which LB1 maintains.

is preferably capable of having multiple virtual IP addresses as is well known. It is a particular feature of the present invention for LB2 to designate a currently unused virtual IP address, such as 200.100.1.1, for LB1's use and store the mapping between the IP address of LB1 and the designated IP address in a triangulation mapping table 32, as is shown more particularly with reference to FIG. 1B. The designated address is referred to herein as the triangulation address and may be preconfigured with LB1 or periodically provided to LB1 from LB2. LB1 preferably maintains in a client mapping table 36 a mapping of the IP address 197.1.33.5 of client 26 and the triangulation address 200.100.1.1 of LB2 to which client 26's requests may be redirected.

As shown in the example of FIG. 1A, server status table 22 of LB1 indicates that no servers in server farm 10 are available to service client 26's request, but indicates that server farm 12 is available. Having decided that client 26's request should be forwarded to LB2, in FIG. 1C LB1 substitutes the destination IP address of request 28 with the virtual IP address 200.100.1.1 of LB2 which is now mapped to the IP address of client 26 as per client mapping table 36 and sends an address-modified client request 38 to LB2. LB2, upon receiving request 38 at its virtual IP address 200.100.1.1, checks triangulation mapping table 32 and finds that virtual IP address 200.100.1.1 has been designated for LB1's use. LB2 therefore uses the virtual IP address 100.100.1.0 of LB1 as per triangulation mapping table 32 as the source IP address of an outgoing response 40 that LB2 sends to client 26 after the request has been serviced by one of the servers in server farm 12 selected by LB2. It is appreciated that response 40 must appear to client 26 to come from LB1, otherwise client 26 will simply ignore response 40 as an unsolicited packet. Client 26 may continue to send requests to LB1 which LB1 then forwards requests to LB2 at the designated triangulation address. LB2 directs requests to an available server and sends responses to client 26 indicating LB1 as the source IP address.

Reference is now made to FIGS. 2A-2F which, taken together, are simplified pictorial flow illustrations of a network proximity load balancing system constructed and operative in accordance with another preferred embodiment of the present invention. The configuration of the system of FIGS. 2A-2F is substantially similar to FIGS. 1A-1C except as otherwise described hereinbelow. For illustration purposes, a third server farm, generally designated 50, is shown connected to network 14, although it is appreciated that two or more server farms may be provided. Server farm 50 typically comprises a load balancer 52, which may be a dedicated load balancer or a server or router configured to operate as a load balancer, with load balancer 52 being connected to two or more servers 20. Load balancer 52 is alternatively referred to herein as LB3.

Typical operation of the network proximity load balancing system of FIGS. 2A-2F is now described by way of example. As is shown more particularly with reference to FIG. 2A, client 26 is shown sending request 28, such as an FTP or HTTP request, to LB1 whose virtual IP address is 100.100.1.0. LB1 preferably maintains a proximity table 54 indicating subnets and the best server farm site or sites to which requests from a particular subnet should be routed. Determining the "best" site is described in greater detail hereinbelow.

Upon receiving a request, LB1 may decide to service the request or not based on normal load balancing considerations. In any case, LB1 may check proximity table 54 for an entry indicating the subnet corresponding to the subnet of the source IP address of the incoming request. As is shown more particularly with reference to FIG. 2B, if no corresponding entry is found in proximity table 54, LB1 may send a proximity request 56 to LB2, and LB3, whose virtual IP addresses are known in advance to LB1. Proximity request 56 indicates the IP address of client 26.

A "network proximity" may be determined for a requestor such as client 26 with respect to each load balancer/server farm by measuring and collectively considering various attributes of the relationship such as latency, hops between client 26 and each server farm, and the processing capacity and quality of each server farm site. To determine comparative network proximity, LB1, LB2, and LB3 preferably each send a polling request 58 to client 26 using known polling mechanisms. While known polling mechanisms included pinging client 26, sending a TCP ACK message to client 26 may be used where pinging would otherwise fail due to an intervening firewall or NAT device filtering out a polling message. A TCP ACK may be sent to the client's source IP address and port. If the client's request was via a UDP connection, a TCP ACK to the client's source IP address and port 80 may be used. One or both TCP ACK messages should bypass any intervening NAT or firewall and cause client 26 to send a TCP RST message, which may be used to determine both latency and TTL. While TTL does not necessarily indicate the number of hops from the client to the load balancer, comparing TTL values from LB1, LB2, and LB3 should indicate whether it took relatively more or less hops.

Another polling method involves sending a UDP request to a relatively high port number at the client, such as 2090. This request would typically be answered with an "ICMP port unreachable" reply which would indicate the TTL value of the UDP request on arrival at the client. Since the starting TTL value of each outgoing UDP request is known, the actual number of hops to the client may be determined by subtracting the TTL value on arrival at the client from the starting TTL value. A combination of pinging, TCP ACK, UDP, and other polling techniques may be used since any one polling request might fail.

Figure 2C:
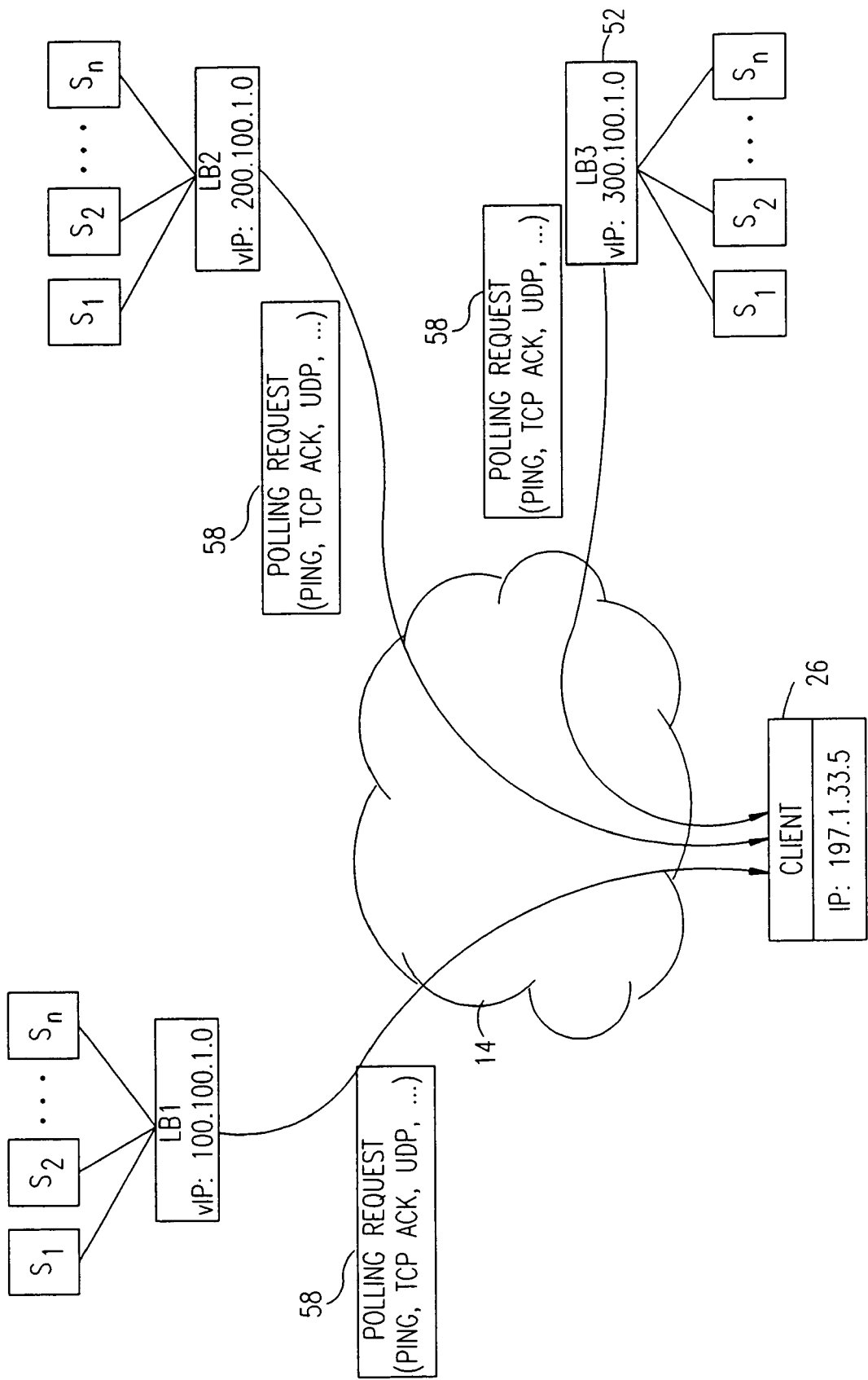
Figure 2D:
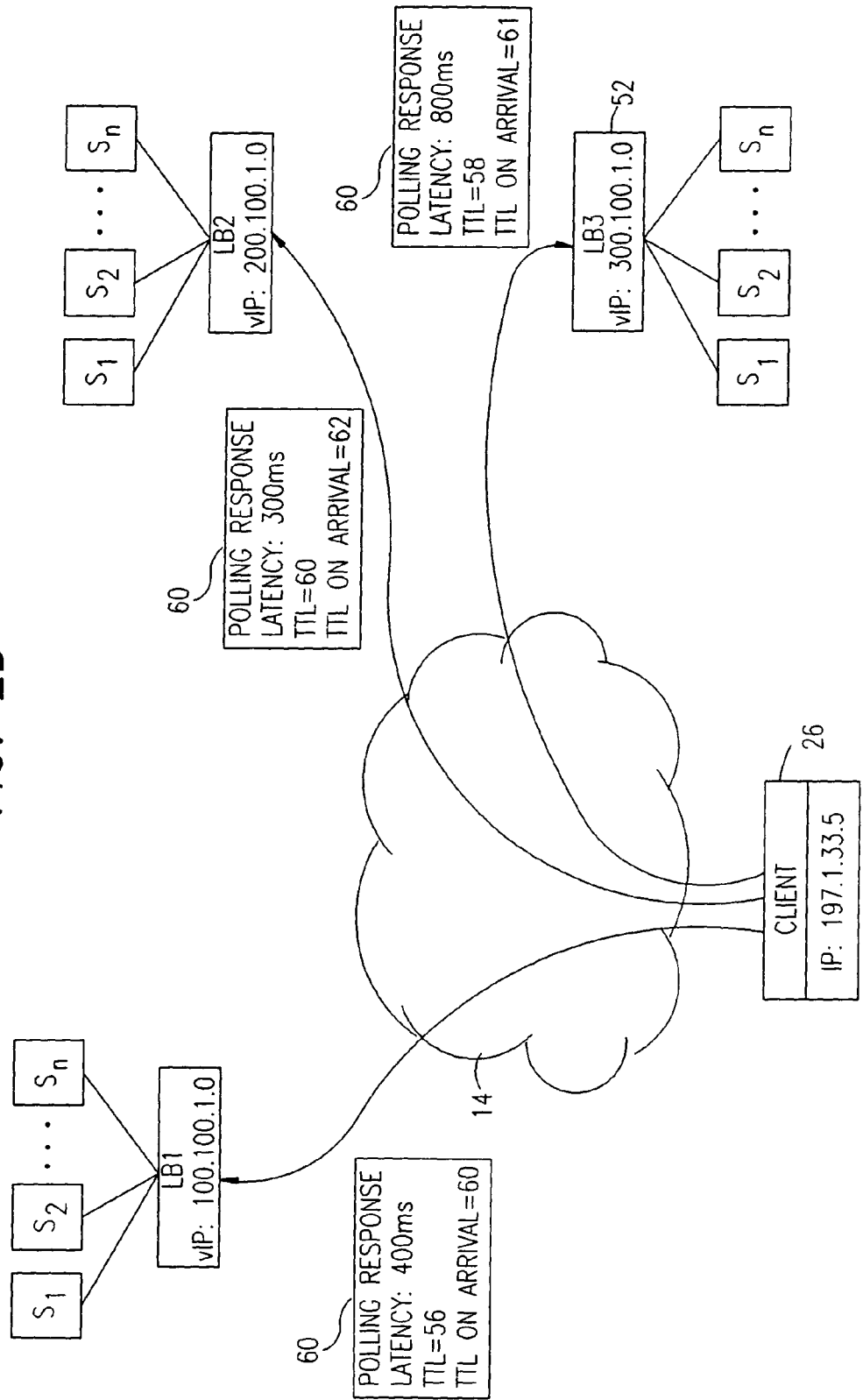
Figure 2E:
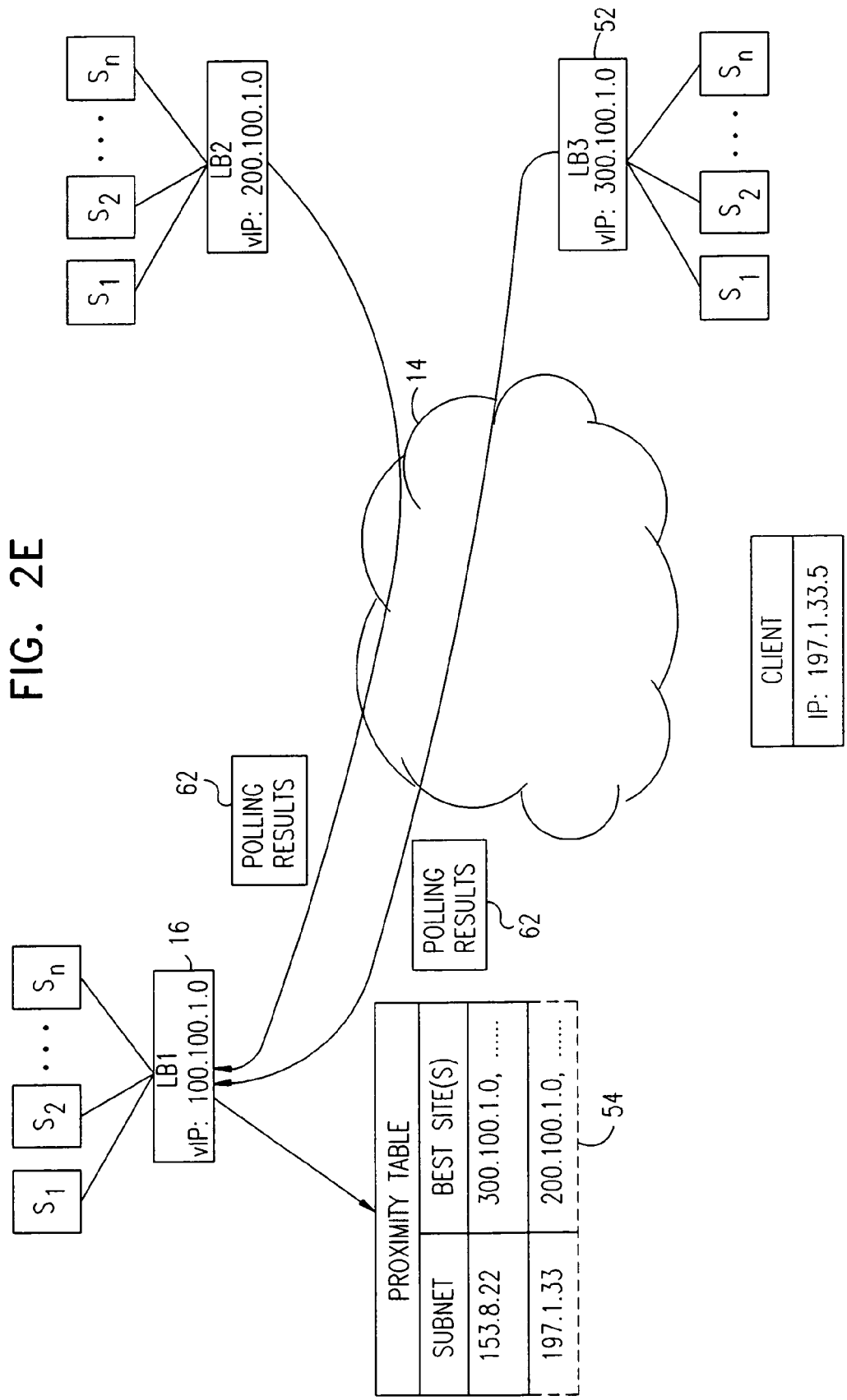

Client 26 is shown in FIG. 2D sending a polling response 60 to the various polling requests. The responses may be used to determine the latency of the transmission, as well as the TTL value. LB2 and LB3 then send polling results 62 to LB1, as shown in FIG. 2E. The polling results may then be compared, and LB1, LB2, and LB3 ranked, such as by weighting each attribute and determining a total weighted value for each server farm. Polling results may be considered together with server farm capacity and availability, such as may be requested and provided using known load balancing reporting techniques or as described hereinabove with reference to FIGS. 1A and 1B, to determine the server farm site that is "closest" to client 26 and, by extension, the client's subnet, which, in the example shown, is determined to be LB2. For example, the closest site may be that which has the lowest total weighted value for all polling, load, and capacity results. LB1 may then store the closest site to the client/subnet in proximity table 54.

As was described above, a load balancer that receives a request from a client may check proximity table 54 for an entry indicating the subnet corresponding to the subnet of the source IP address of the incoming request. Thus, if a corresponding entry is found in proximity table 54, the request is simply routed to the location having the best network proximity. Although the location having the best network proximity to a particular subnet may have already been determined, the load balancer may nevertheless decide to forward an incoming request to a location that does not have the best network proximity should a load report received from the best location indicate that the location is too busy to receive requests. In addition, the best network proximity to a particular subnet may be periodically redetermined, such as at fixed times or after a predetermined amount of time has elapsed from the time the last determination was made.

As is shown more particularly with reference to FIG. 2F, once the closest site for client 26 has been determined, client 26 may be redirected to the closest site using various methods. If a DNS request is received from client 26, LB1 may respond with LB2's address. If an HTTP request is received from client 26, HTTP redirection may be used. Alternatively, regardless of the type of request received from client 26, triangulation as described hereinabove with reference to FIGS. 1A-1C may be used.

It is appreciated that elements of the present invention described hereinabove may be implemented in hardware, software, or any suitable combination thereof using conventional techniques.

It is appreciated that the steps described with reference to FIGS. 1A-1C and 2A-2F need not necessarily be performed in the order shown unless otherwise indicated, and that in fact different implementations of the steps may be employed to yield similar overall results.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A method of load balancing in a network comprising multiple geographic network locations, each of at least two of such locations respectively having a load balancer, the load balancer at one of said locations being referred to as a first load balancer and the load balancer at the other of said locations being referred to as a second load balancer, each of said load balancers having a respective IP address and each load balancer serving as a gateway to respective servers at that location, the method comprising the steps of:

polling by at least said first and second load balancers of a polled client located at yet an other network location different from the respective locations of said at least first and second load balancers to determine a hop count related measurement or a round trip latency related measurement, respectively, between each of said at least first and second load balancers and said polled client;

collecting by said first load balancer of the measurement information from both said at least first and second load balancers;

maintaining by said first load balancer traffic load or capacity information related to servers at its location as well as related to said second load balancer;

receiving by said first load balancer of an HTTP request having a destination IP address from a requesting client at said other network location;

performing by said first load balancer a selection between said servers at its own location and the at least said second load balancer for servicing said HTTP request, and forwarding of said HTTP request by said first load balancer to at least said second load balancer using the IP address of said at least second load balancer, as the destination IP address of the forwarded HTTP request, when said first load balancer selects said second load balancer to service said HTTP request.

2. A method according to claim 1, wherein said requesting client is a client other than the polled client that was, both clients however being in a same IP subnet.

3. A method according to claim 1, wherein said polled client has an IP address and polling of a client is achieved by using a polling request having an destination IP address and using the IP address of the polled client as the destination IP address in the polling request from said at least first and second load balancers.

4. A method according to claim 1, wherein said selection is determined by said first load balancer based upon said hop count measurements or round trip latency measurements information as well as the information about the traffic load or processing capacity.

5. A method according to claim 1, wherein said first load balancer stores the information on traffic load or capacity information of its servers and of said at least second load balancer, as well as the measurement information polled by both said at least first and second load balancers, in a storage memory in said first load balancer.

6. A network load balancing system, comprising:
a network;
at least first and second load balancing devices, said at least first and second load balancing devices each having an IP address and each being located at geographically different network locations;
a plurality of servers, each load balancing device serving as a gateway to respective ones of said servers that it services;
a storage memory in said first load balancing device for storing traffic load or processing capacity information related to its servers and to at least said second load balancing device;
a plurality of clients;
each of said at least first and second load balancing devices are operative to poll a first client located at an other network location different from the locations of said at least first and second load balancing devices, to determine the hop count related measurement or the round trip latency related measurement, respectively, between each of said at least first and second load balancing devices and said first client;
said first load balancing device is operative to collect the measurement information from both said at least first and second load balancing devices and storing the information in said storage memory;
said first load balancing device is operative to receive an HTTP request having a destination IP address from a second client, and based upon the information stored in said storage memory make a selection between its servers and said at least second load balancing device for servicing said HTTP request; and
when selecting said second load balancing device, said first load balancing device is operative to forward said HTTP request to the second load balancing device using the IP address of the second load balancing device as the destination IP address of the forwarded HTTP request.

7. The network according to claim 6, wherein said first client and second client are the same one.

8. The network according to claim 6, wherein said first and second clients each have a respective IP address and wherein said IP addresses are different, however both being in the same IP subnet.

9. A network according to claim 6, wherein said first and second clients each have a respective IP address, wherein said at least first and second load balancing devices are operative to poll said first client by using a polling request having a destination IP address and using the IP address of the first client as the destination IP address of the polling request from said at least first and second load balancing devices.

10. A load balancing device for load balancing at least two servers located within a computer network, the network comprising multiple geographic network locations with at least another load balancing device at another network location, said load balancing device comprising:
a storage memory located therein for storing traffic load or processing capacity information related to its servers and to at least the another load balancing device;
a polling mechanism for polling a polled client located at a network location different from the network location of said load balancing device and different from the network location of the another load balance device, the polling mechanism determines the hop count related measurement or the round trip latency related measurement, between said load balancing device and said polled client;
a collector for requesting the another load balancing device to obtain similar information between that another load balancing device and the same client and for collecting the measurement information obtained from said polling mechanism as well as the information the another load balancing device obtains, and storing all such information in said storage memory;
a receiving mechanism for receiving an HTTP request having a destination IP address from a requesting client;
a selector operative to make a selection between using its servers or said at least another load balancing device for servicing said HTTP request based upon the information stored in said storage memory; and
a transmitter for forwarding the HTTP request to the at least the another load balancing device using the IP address of the said another load balancing device as the destination IP address of the forwarded HTTP request, when it selects the another load balancing device to service the HTTP request.

11. The device according to claim 10, wherein said HTTP request is from the same client that was polled.

12. The network according to claim 10, wherein said HTTP request is from a requesting client other then the polled client, both clients however being in a same IP subnet.

13. A device according to claim 10, wherein said polled client has an IP address, and said polling mechanism polls said polled client by using a polling request having a destination IP address and using the IP address of the polled client as the destination IP address of the polling request.

* * * * *